United States Patent
Mannherz et al.

(10) Patent No.: US 10,538,225 B2
(45) Date of Patent: Jan. 21, 2020

(54) METHOD FOR OPERATING A MOTOR VEHICLE, CONTROL DEVICE FOR A BRAKING SYSTEM, AND BRAKING SYSTEM FOR A MOTOR VEHICLE

(71) Applicant: Robert Bosch GmbH, Stuttgart (DE)

(72) Inventors: Edith Mannherz, Weinsberg (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/777,508

(22) PCT Filed: Nov. 22, 2016

(86) PCT No.: PCT/EP2016/078465
§ 371 (c)(1),
(2) Date: May 18, 2018

(87) PCT Pub. No.: WO2017/102266
PCT Pub. Date: Jun. 22, 2017

(65) Prior Publication Data
US 2018/0345921 A1 Dec. 6, 2018

(30) Foreign Application Priority Data

Dec. 16, 2015 (DE) .................. 10 2015 225 379
May 20, 2016 (DE) .................. 10 2016 208 766

(51) Int. Cl.
*B60T 7/12* (2006.01)
*B60T 8/88* (2006.01)

(52) U.S. Cl.
CPC ............... *B60T 7/12* (2013.01); *B60T 8/885* (2013.01); *B60T 2201/10* (2013.01);
(Continued)

(58) Field of Classification Search
CPC ...... B60L 15/10; B60L 15/20; B60L 15/2063; B60L 15/2072; B60L 15/32;
(Continued)

(56) References Cited

U.S. PATENT DOCUMENTS 4,629,043 A * 12/1986 Matsuo .................. B60T 7/107
188/2 D
5,634,446 A * 6/1997 Rauznitz ................ B60K 31/00
123/322

(Continued)

FOREIGN PATENT DOCUMENTS

DE 10 2006 048 910 A1 4/2008
DE 10 2012 202 175 A1 8/2013
(Continued)

OTHER PUBLICATIONS

International Search Report corresponding to PCT Application No. PCT/EP2016/078465, dated Feb. 3, 2017 (German and English language document) (7 pages).

*Primary Examiner* — Babar Sarwar
(74) *Attorney, Agent, or Firm* — Maginot, Moore & Beck LLP

(57) ABSTRACT

A method for operating a motor vehicle includes carrying out an automated driving process that includes using a first braking device to decelerate the motor vehicle in an automated manner. The method further includes recording at least one operating parameter of the motor vehicle during the automated driving process, and carrying out a check in order to determine whether the at least one operating parameter satisfies a predetermined test criterion. The method also includes decelerating the motor vehicle in an automated manner using a second braking device if the at least one operating parameter does not satisfy the test criterion.

12 Claims, 3 Drawing Sheets

(52) U.S. Cl.
CPC ... *B60T 2270/402* (2013.01); *B60T 2270/406* (2013.01); *B60T 2270/413* (2013.01)

(58) Field of Classification Search
CPC ..... B60L 2240/423; B60L 7/10; B60W 10/00; B60W 10/08; B60W 20/00; F16H 2057/123; F16H 57/12; Y02T 10/72; Y02T 10/7275
See application file for complete search history.

(56) References Cited

U.S. PATENT DOCUMENTS

| | | | | |
|---|---|---|---|---|
| 6,326,887 B1* | 12/2001 | Winner | ............... | B60Q 9/007 180/167 |
| 6,587,760 B2* | 7/2003 | Okamoto | ............... | B60Q 9/005 340/932.2 |
| 6,654,670 B2* | 11/2003 | Kakinami | ............... | B60Q 9/005 348/119 |
| 6,778,891 B2* | 8/2004 | Tanaka | ............... | B62D 15/028 180/204 |
| 7,035,735 B2* | 4/2006 | Knoop | ............... | B60T 7/22 180/169 |
| 7,043,346 B2* | 5/2006 | Kubota | ............... | B62D 15/0285 340/932.2 |
| 7,053,795 B2* | 5/2006 | Maemura | ............... | B60Q 9/005 340/435 |
| 7,103,460 B1* | 9/2006 | Breed | ............... | B60C 23/0408 701/29.1 |
| 7,344,205 B2* | 3/2008 | Kamiya | ............... | B60T 7/22 303/124 |
| 8,180,525 B2* | 5/2012 | Luke | ............... | B60C 23/061 701/25 |
| 8,277,365 B2* | 10/2012 | Ohbayashi | ............... | B60K 6/48 477/183 |
| 8,322,798 B2* | 12/2012 | Kondo | ............... | B60T 13/741 188/265 |
| 8,378,850 B2* | 2/2013 | Toledo | ............... | B62D 15/0285 340/435 |
| 9,511,756 B2* | 12/2016 | Nijakowski | ............... | B60T 17/221 |
| 2005/0264099 A1* | 12/2005 | Kamiya | ............... | B60T 7/22 303/15 |
| 2008/0262687 A1* | 10/2008 | Fujita | ............... | B60T 7/12 701/70 |
| 2010/0211282 A1* | 8/2010 | Nakata | ............... | B60T 8/4081 701/70 |
| 2010/0217488 A1* | 8/2010 | Nijakowski | ............... | B60T 17/221 701/48 |
| 2011/0006591 A1* | 1/2011 | Yoshii | ............... | B60T 7/12 303/4 |
| 2012/0200058 A1* | 8/2012 | Sekiya | ............... | B60T 8/346 280/124.162 |
| 2013/0197773 A1* | 8/2013 | Shuler | ............... | B60T 7/12 701/93 |
| 2013/0231839 A1* | 9/2013 | Baehrle-Miller | ............... | B60T 13/588 701/70 |
| 2014/0015310 A1* | 1/2014 | Hanzawa | ............... | B60T 7/12 303/3 |
| 2015/0032323 A1* | 1/2015 | Nijakowski | ............... | B60T 8/885 701/23 |
| 2016/0214595 A1* | 7/2016 | Baehrle-Miller | ............... | B60T 7/22 |
| 2016/0321771 A1* | 11/2016 | Liu | ............... | G06Q 50/30 |
| 2018/0148021 A1* | 5/2018 | Mannherz | ............... | B60T 7/12 |
| 2018/0345921 A1* | 12/2018 | Mannherz | ............... | B60T 7/12 |

FOREIGN PATENT DOCUMENTS

| | | |
|---|---|---|
| DE | 10 2012 217 704 A1 | 6/2014 |
| WO | 2015/036393 A1 | 3/2015 |

* cited by examiner

METHOD FOR OPERATING A MOTOR VEHICLE, CONTROL DEVICE FOR A BRAKING SYSTEM, AND BRAKING SYSTEM FOR A MOTOR VEHICLE

This application is a 35 U.S.C. § 371 National Stage Application of PCT/EP2016/078465, filed on Nov. 22, 2016, which claims the benefit of priority to (i) Serial No. DE 10 2015 225 379.1 filed on Dec. 16, 2015 in Germany and (ii) Serial No. DE 10 2016 208 766.5 filed on May 20, 2016 in Germany, the disclosures of which are incorporated herein by reference in their entirety.

The disclosure concerns a method for operating a motor vehicle, a control unit for a brake system of a motor vehicle, and a brake system for a motor vehicle.

BACKGROUND

Regarding the operation of motor vehicles, automated driving processes are increasingly coming to the fore, wherein in particular automated parking and/or unparking are being discussed, during which a driver does not necessarily have to be in the motor vehicle. In this case, it must be ensured that the motor vehicle can automatically pass into a safe state at all times, even in the event of a fault. In the event of an automated driving process, in this case the safe state is always defined as a standstill. This is preferably achieved by means of an automatic, hydraulic build-up of brake pressure, for example by means of an electronic braking force distribution system or an electrical or electronic brake booster, therefore by means of a service brake of the motor vehicle. An operating system of this type is also referred to below as a service brake unit and constitutes a first braking device of the motor vehicle. For the case in which said service brake unit is unable to build up a braking pressure because of a fault, and as a result to decelerate the motor vehicle to a standstill, a fallback level must be available, in particular in the form of a second, driver-independent brake unit.

In this case, it is typically provided that the fallback level is only activated if a component defect is actually detected in the first braking device. This means in particular that the first braking device downgrades itself, i.e. the presence of a fault must be actively detected and signaled to a higher-level control unit before the fallback level is activated. However, this requires—if it can be carried out at all with sufficient safety—a certain time in which the motor vehicle continues unbraked and can endanger other road users.

All faults that prevent a hydraulic build-up of brake pressure are recognized as critical. Furthermore, long fault detection times are critical, in particular if ambient conditions accelerate the motor vehicle further, for example on an upslope or a downslope.

SUMMARY

It is the object of the disclosure to provide a method for operating a motor vehicle, a control unit for a brake system for a motor vehicle, and a brake system of this type for a motor vehicle, wherein the mentioned disadvantages do not occur. In particular, the operating safety of the motor vehicle shall be increased during automated driving processes.

The object is achieved by providing the objects of the independent claims. Advantageous embodiments arise from the subordinate claims.

The object is in particular achieved by providing a method for operating a motor vehicle, wherein an automated driving process is carried out, wherein a first braking device is used for the automated deceleration of the motor vehicle. During the automated driving process, at least one operating parameter of the motor vehicle is detected. A check is made as to whether the at least one operating parameter satisfies a specified test criterion. The motor vehicle is decelerated automatically with a second braking device if the at least one operating parameter does not satisfy the test criterion. It is thus possible to detect a fault of the first braking device—directly using the operating parameter and the test criterion—earlier, so that the fallback level can be switched to and the second braking device can be activated earlier. In particular, said procedure enables higher-level monitoring of the state of the vehicle during the automated driving process, which is not dependent on the first braking device detecting a fault independently and signaling the fault and/or downgrading itself. Owing to the earlier activation of the second braking device, the maximum possible stopping distances for the motor vehicle are shorter.

An automated driving process means in particular a driving mode of the motor vehicle in which the vehicle is driving independently, in particular without the intervention of a driver. The automated driving process is preferably a process in which no driver is present in the motor vehicle. The automated driving process is preferably an automated parking or unparking process.

An operating parameter of the motor vehicle means in particular a parameter that characterizes a current driving state of the motor vehicle. The operating parameter is in particular not a state of the first braking device, in particular it is not a detected fault case and/or a corresponding message. Rather, it is a higher-level parameter that describes a state of the motor vehicle, wherein the state, in particular fault-free or faulty operation, of the first braking device can be directly concluded from said parameter.

In particular, the second braking device is different from the first braking device. This does not necessarily mean that the first braking device and the second braking device are completely separate from each other, i.e. are different in all the parts thereof. Rather, it is possible that the second braking device and the first braking device make use of identical components, for example wheel brakes, or even at least partly of an identical hydraulic brake circuit. It is important that the second braking device and the first braking device are mutually independent insofar as they enable the independent build-up of brake pressure and/or independent initiation of a braking action, so that the second braking device is actually a fallback level for the case in which the first braking device fails.

The first braking device is preferably a service brake of the motor vehicle, which can in particular comprise a device for producing a hydraulic braking pressures, for example an electrical and/or electronic brake booster, and/or an electronic braking force distribution system.

The motor vehicle is preferably decelerated to a standstill with the second braking device if the at least one operating parameter does not satisfy the test criterion. This has the advantage that the motor vehicle is definitely brought into a safe state.

According to a preferred embodiment, it is provided that the motor vehicle is secured at a standstill, so that it cannot be moved at least without the intervention of a driver.

Particularly preferably, a handover to a driver is carried out in the safe and preferably secured state. The automated driving process is thus terminated. In this case, it is typically assumed therefrom that the vehicle has not yet reached an end position in which it can be permanently parked. It is therefore useful that the vehicle is definitely handed over to a driver, so that the driver can bring it into an end position.

According to a development of the disclosure, it is provided that the at least one operating parameter is selected from a group consisting of a current speed, a current acceleration, and a current yaw rate of the motor vehicle. In this case, an acceleration means both a positive and also a negative acceleration, in particular therefore also a deceleration. Using at least one of said operating parameters, it is easily possible to monitor a state of the motor vehicle during the automated driving process and in particular to check whether the first braking device is working as envisaged.

To detect a current speed and/or a current acceleration of the motor vehicle, at least one revolution rate sensor on at least one wheel of the motor vehicle is preferably used. In particular, in order to achieve redundancy, a revolution rate sensor is preferably associated with each wheel of the motor vehicle, wherein preferably all revolution rate sensors are analyzed to detect the at least one operating parameter.

In particular, with an automated parking or unparking process, a current speed and/or a current acceleration can advantageously be used as the operating parameter, because the motor vehicle only has low speeds and accelerations in this case.

According to a development of the disclosure, it is provided that whether a current deceleration of the motor vehicle corresponds to a current demand on the first braking device is used as the test criterion. Therefore, in particular the current acceleration—here in the sense of a deceleration—is observed and checked as to whether it corresponds to an expected value for the current acceleration—in particular within predefined tolerances—, which arises if the first braking device is working correctly according to the demand. On the one hand, a request is also made to the first braking device in the form of the current demand, which can be specified in particular as the demand for a setpoint brake torque, a setpoint volumetric flow in the hydraulic brake circuit, as a setpoint braking pressure for the hydraulic brake circuit, or can be specified in another way. A deceleration setpoint value can be calculated from the current demand for the first braking device that in turn is checked as to whether it coincides with the actually detected current acceleration—in particular within the predetermined tolerances. If this is the case, it is assumed therefrom that the first braking device is operating fault-free. If this is not the case, the first braking device is clearly not operational, even if it has not detected this itself and should have downgraded itself accordingly. The second braking device can be used directly to decelerate the motor vehicle.

Additionally or alternatively, whether a current speed of the motor vehicle corresponds to a current demand on the first braking device is preferably used as a test criterion. Instead of the current acceleration, the current speed can also be used, because this too can in particular be calculated based on a known speed at a previous point in time and the current demand on the first braking device or a series of such previous demands against time. A check is preferably made as to whether the speed of the motor vehicle is reduced according to an expected profile based on the demands on the first braking device. If this is not the case, a fault in the first braking device can be assumed.

Additionally or alternatively, it is preferably provided that whether the current speed of the motor vehicle is less than a predetermined speed limit for the automated driving process is used as a test criterion. Said speed limit is preferably specified for the specific automated driving process that is in use. In particular, a defined upper speed threshold is specified for automated parking or unparking processes, which for example can range from at least 2 km/h to no more than 7 km/h. These are speeds at which an automated driving process of this type can be controlled. The control of the motor vehicle ensures that the upper speed threshold is not exceeded during the automated driving process—in particular by actuating the first braking device.

The speed limit is preferably chosen to be greater than the upper speed threshold for the automated driving process in order to take account of possible overshoots and thereby to increase the robustness of the function described here, for example at 9 km/h. In this respect, it is also ensured that the speed limit is not reached during the automated driving process with a normally operating first braking device. If it should be reached or exceeded, a fault in the first braking device can be assumed. A handover to the driver should then take place. However, the motor vehicle must previously be decelerated to a standstill and secured, because the driver is preferably located outside the motor vehicle.

According to a development of the disclosure, it is provided that the test criterion is only applied if the first braking device is actuated to decelerate the motor vehicle. That the test criterion is applied means in particular that the corresponding checking is carried out. The embodiment represented here is in particular purposeful if the at least one operating parameter is checked regarding a current demand on the first braking device. In this case, a failure of the first braking device can only be reliably determined if the first braking device is also actually actuated to decelerate the motor vehicle.

Alternatively or additionally, it is preferably provided that the test criterion is applied regardless of a state of the first braking device, in particular regardless of actuation of the first braking device. This is in particular possible and useful if the current speed of the motor vehicle is compared with a predetermined speed limit. Said speed limit may not be exceeded regardless of whether the first braking device is currently actuated or not. It is therefore important in any case to decelerate the motor vehicle if said speed limit is exceeded.

The previously presented embodiments of the method can of course be combined with each other. It is then possible, in any operating situation, to check the automated driving process reliably and rapidly as to whether the first braking device is operational, and whether a current speed of the motor vehicle remains below the predetermined speed limit.

According to a development of the disclosure, it is provided that the first braking device is monitored for faults, wherein the second braking device is actuated if a fault is detected in the first braking device. The monitoring of the first braking device is preferably carried out constantly, in particular continuously, or periodically. The monitoring of the first braking device is preferably carried out in addition to the previously described measures. In this way, it is ensured that a fault in the first braking device can also be detected by said device itself, so that the first braking device can also continue to downgrade itself if necessary. I.e., if a fault is detected in the first braking device, said device preferably downgrades itself, wherein the second braking device is thereupon actuated.

According to a development of the disclosure, it is provided that the first braking device is additionally actuated following actuation of the second braking device. This is in particular purposeful if the second braking device has significantly poorer dynamic properties than the first braking device, for example because the second braking device operates electromotively, whereas the first braking device operates hydraulically.

It is preferably provided that the motor vehicle is secured if it has been decelerated to a standstill by the second braking device. In this case, it is in particular possible that the second braking device, in particular if configured as an automated parking brake, is locked. Alternatively or additionally, it is possible that a transmission pawl is engaged or independent rolling away by the motor vehicle is prevented in another suitable manner. This enables the motor vehicle to be secured and enables a safe handover to the driver.

It is preferably provided that a handover to the driver is carried out if the motor vehicle has been decelerated to a standstill by the second braking device, and preferably after it has been secured at a standstill. The handover to the driver is sensible, because the motor vehicle has probably not yet reached a predetermined end position following the deceleration to a standstill by the second braking device—especially because of a fault having occurred—but is in an undefined position and may be an obstruction to traffic.

The object is finally also achieved by providing a control unit for a brake system that is arranged to carry out one of the previously described embodiments of the method. In this case, in particular the advantages that have already been described in connection with the method are realized in connection with the control unit.

It is possible that the control unit is embodied as a control unit for a motor vehicle.

The object is finally also achieved by providing a brake system for a motor vehicle that comprises a first braking device and a second braking device, wherein it comprises furthermore a control unit according to any one of the previously described exemplary embodiments. Thus, the advantages that have already been described in connection with the method and the control unit are realized in connection with the brake system.

The brake system is preferably a brake system for a motor vehicle. In particular, the control unit of the brake system can be a control unit of the motor vehicle.

According to a development of the disclosure, it is provided that the second braking device is embodied as an automatic parking brake device (APB). An automatic parking brake device of this type is preferably actuated by electric motor and thus independently of the hydraulic braking pressure of the first braking device. As a result, the automated parking brake device is particularly suitable as a fallback level for the first braking device.

Because of the actuation by electric motor however, the automatic parking brake device comprises significantly poorer dynamic behavior than the first braking device, so that after actuating the automatic parking brake device it can be purposeful to seek to also still activate the first braking device in addition.

The disclosure finally also includes a motor vehicle comprising a brake system according to any one of the previously described exemplary embodiments. In this case, the advantages that have already been described in connection with the method, the control unit and the brake system described also result in connection with the motor vehicle.

BRIEF DESCRIPTION OF THE DRAWINGS

The disclosure is described in detail below using the drawing. In the figures.

DETAILED DESCRIPTION

Figure 1:
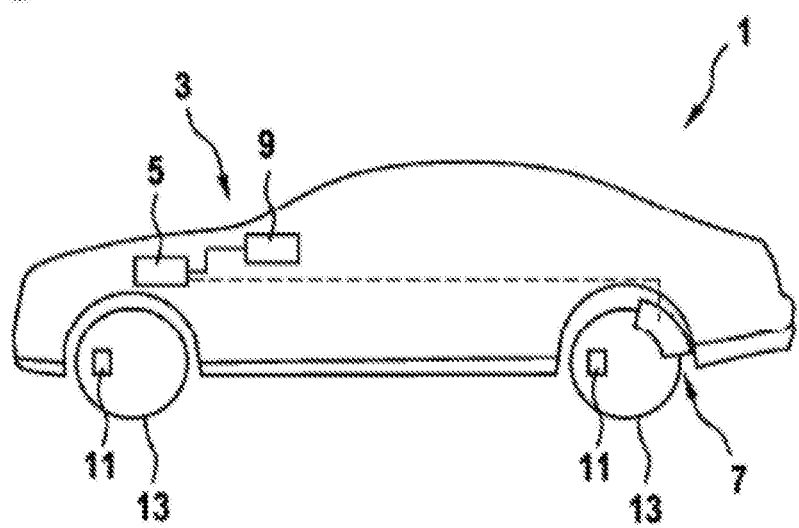
FIG. 1 shows a schematic representation of an exemplary embodiment of a motor vehicle with a brake system.

FIG. 1 shows a schematic representation of an exemplary embodiment of a motor vehicle 1 with a brake system 3, wherein the motor vehicle 1 is arranged to carry out an automated driving process. The brake system 3 comprises a first braking device 5 that is embodied as a service brake of the motor vehicle 1, wherein the first braking device 5 is arranged to be able to build up a hydraulic braking pressure independently of the driver. In this case, in particular it can be an electrical or electronic brake booster, an electronic braking force distribution system (Electronic Stability Program—ESP) that is capable of independent pressure build-up, or another suitable system.

The brake system 3 comprises a second braking device 7 that is preferably embodied as an automatic parking brake device, in particular as an automatic parking brake device that is actuated by electric motor.

A control unit 9 is provided that is arranged for actuating the brake system 3. The control unit 9 is preferably also arranged for carrying out the automated driving process. Particularly preferably, the control unit is embodied as a central control unit of the motor vehicle 1.

The control unit 9 is in particular arranged for carrying out a method for operating the motor vehicle 1 during an automated driving process, in the sense of the embodiments described previously and below.

In this case, the control unit 9 is in particular arranged to detect at least one operating parameter of the motor vehicle 1, in particular a current speed, a current acceleration, and/or a current yaw rate. For detecting the operating parameter, at least one sensor 11 is preferably provided, wherein two sensors 11 are represented schematically here as revolution rate sensors on wheels 13 of the motor vehicle 1. These are suitable in a particular way for detecting a speed and/or an acceleration of the motor vehicle 1.

The first braking device 5 is used for decelerating the motor vehicle 1 during the automated driving process, wherein the at least one operating parameter of the motor vehicle 1 is detected during the automated driving process. A check is carried out as to whether said parameter satisfies a specified test criterion, wherein the motor vehicle 1 is decelerated with the second braking device 7 if the at least one operating parameter does not satisfy the test criterion.

Figure 2:
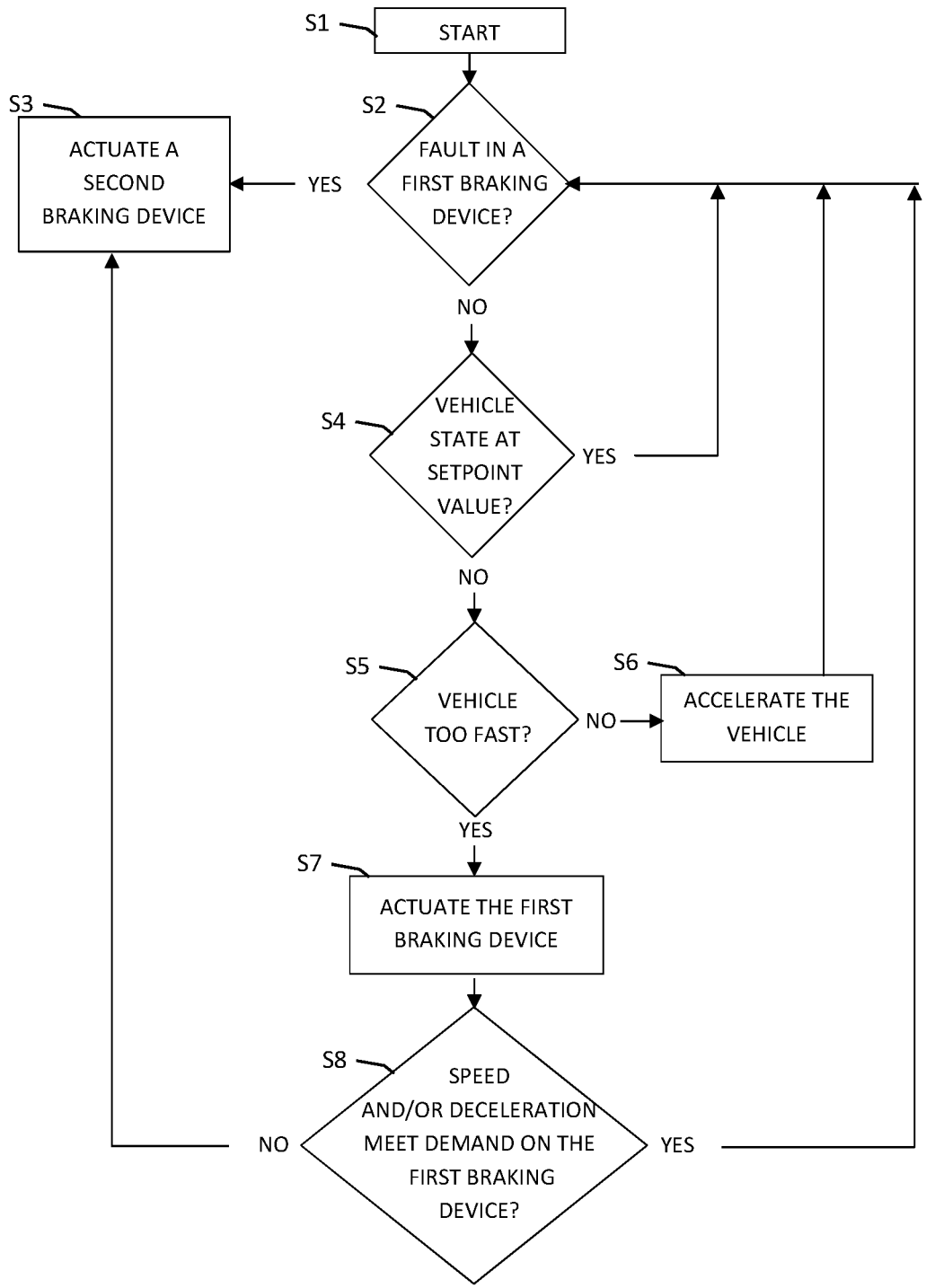
FIG. 2 shows a schematic representation of a first embodiment of a method for operating a motor vehicle in the form of a flow chart.

FIG. 2 shows a schematic representation of a first embodiment of a method for operating the motor vehicle 1. The method starts in a first step S1. In a second step S2, a check is carried out as to whether there is a fault in the first braking device 5, in particular whether said device has downgraded itself. If this is the case, the second braking device 7 is used for deceleration of the motor vehicle 1 in a third step S3.

On the other hand, if there is no fault, the method is continued in a fourth step S4, wherein here a check is carried out as to whether the state of the motor vehicle 1, which is described by at least one operating parameter, corresponds to a setpoint value. In particular, a check is preferably carried out here as to whether a current speed of the motor vehicle corresponds to a demand. If this is the case, the method is continued in the second step S2 and thus passes through a loop.

If by contrast it is determined in the fourth step S4 that the vehicle state does not correspond to the demand, a check is carried out in a fifth step S5 as to whether the motor vehicle 1 is too fast. If this is not the case, this means that the motor vehicle 1 is too slow—because the current driving state of the motor vehicle 1 does not corresponds to the desired state. In this case, an acceleration of the motor vehicle is carried out in a sixth step S6, after which the method is again continued in the second step S2.

If by contrast it is determined in the fifth step S5 that the motor vehicle is too fast, the first braking device 5 is actuated in a seventh step S7 in order to decelerate the motor vehicle 1. In an eighth step S8, a check is carried out as to whether the current deceleration and/or the current speed of the motor vehicle 1 correspond(s) to the current demand on the first braking device 5. If this is the case, it can be concluded that the first braking device 5 is working properly, and the method is continued in the second step S2. If by contrast it is not the case, a fault in the first braking device 5 can be concluded, which for example can be caused by a pump failure, a microcontroller failure, or a vehicle network failure. In this case, the method is continued from the eighth step S8 into the third step S3, and the motor vehicle 1 is decelerated with the second braking device 7.

In the case of the first embodiment of the method according to FIG. 2, the test criterion is preferably only applied if the first braking device 5 is actuated for deceleration of the motor vehicle 1. I.e., only in this way can it be determined that the at least one operating parameter does not correspond to an expected value resulting from the current demand on the first braking device 5.

Figure 3:
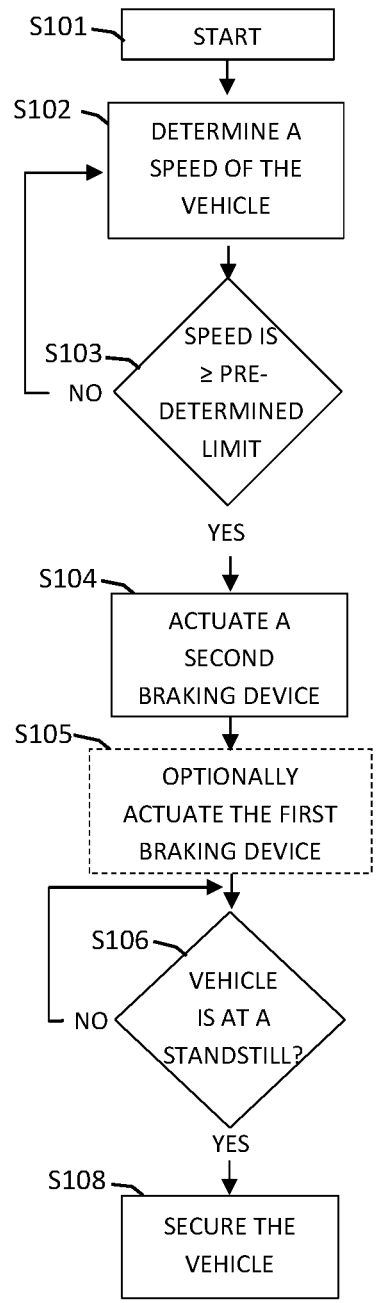
FIG. 3 shows a schematic representation of a second embodiment of the method in the form of a flow chart.

FIG. 3 shows a schematic representation of a second embodiment of the method in the form of a flow chart. The method starts in a first step S101. In a second step S102, a current speed of the motor vehicle 1 is determined as an operating parameter, wherein in a third step S103 a check is carried out as to whether said current speed is greater than or equal to a predetermined speed limit for the automated driving process. If this is not the case, the method is continued in the second step S102 and thus passes through a loop.

If by contrast it is determined in the third step S103 that the current speed of the motor vehicle 1 is actually greater than or equal to the speed limit, the second braking device 7 is actuated in a fourth step S104 for deceleration of the motor vehicle 1. The idea behind this is that the current speed of the motor vehicle 1 is only greater than the predetermined speed limit if the first braking device 5 is not operational, because otherwise said device would have been active in a timely manner in order to decelerate the motor vehicle 1, so that it would not have reached or exceeded the predetermined speed limit.

In an optional fifth step S105, the first braking device 5 is preferably additionally actuated in the fourth step S104 after actuation of the second braking device 7. This is purposeful because the first braking device 5—if it is operational after all or operational again—has higher dynamics than the second braking device 7.

In a sixth step S106, a check is carried out as to whether the motor vehicle 1 has reached a standstill.

If this is not the case, the method continues by repeating the sixth step S106 until the motor vehicle 1 has reached a standstill. Thereafter, securing the motor vehicle 1 is carried out in a seventh step S107, for example by clamping or locking the second braking device 7 that is embodied as an automatic parking brake device, and/or by engaging a transmission pawl. Then a handover to a driver is preferably carried out.

In the context of the second embodiment of the method represented in FIG. 3, the analysis of the test criterion is preferably carried out independently of a state of the first braking device 5, i.e. in particular independently of whether said device 5 has been actuated or not. I.e., the speed limit may never be reached or exceeded.

Additionally, in both the embodiments represented here, the method preferably monitors the first braking device 5 for a fault, wherein the second braking device 7 is actuated if a fault is detected in the first braking device 5. In particular, this concerns a case in which the first braking device 5 itself detects that it is not operational and downgrades itself relative to the control unit 9.

Overall, it is shown that using the method, the control unit 9 and the brake system 3 proposed here, increased safety can be guaranteed for an automated driving process of the motor vehicle 1.

The invention claimed is:

1. A method for operating a motor vehicle, comprising:
   carrying out an automated driving process;
   actuating a first braking device that, in an operative state, is configured to decelerate the motor vehicle;
   detecting, during the automated driving process, at least one operating parameter of the motor vehicle, the at least one operating parameter characterizing a driving state of the motor vehicle other than a state of the first braking device;
   checking whether the at least one operating parameter satisfies a specified test criterion configured such that the specified test criterion is not satisfied when the first braking device is in a fault state; and
   in response to the at least one operating parameter not satisfying the specified test criterion, actuating a second braking device to decelerate the motor vehicle.

2. The method as claimed in claim 1, wherein the at least one operating parameter is selected from a group consisting of a current speed of the motor vehicle, a current acceleration of the motor vehicle, and a current yaw rate of the motor vehicle.

3. The method as claimed in claim 1, wherein the specified test criterion includes at least one of determining (i) whether a current deceleration of the motor vehicle corresponds to a current demand on the first braking device, (ii) whether a current speed of the motor vehicle corresponds to the current demand on the first braking device, and (iii) whether the current speed of the motor vehicle is less than a predetermined speed limit for the automated driving process.

4. The method as claimed in claim 1, further comprising:
   applying the specified test criterion in response to the actuating of the first braking.

5. The method as claimed in claim 1, further comprising:
   applying the specified test criterion independently of the actuating of the first braking device.

6. The method as claimed in claim 1, further comprising:
   detecting a fault in the first braking device; and
   independently of whether the at least one operating parameter satisfies the specified test criterion, actuating the second braking device in response to detecting the fault in the first braking device.

7. The method as claimed in claim 1, further comprising:
   following actuation of the second braking device, actuating the first braking device in addition.

8. The method as claimed in claim 1, wherein the method is executed by a control unit for a brake system of the motor vehicle.

9. The method as claimed in claim 1, wherein:
the first braking device is a hydraulic braking device; and
the second braking device is an electric braking device.

10. A brake system for a motor vehicle comprising:
a first braking device;
a second braking device; and
a control unit operatively connected to the first braking device and the second braking device and configured to:
carry out an automated driving process;
actuate the first braking device;
detect, during the automated driving process, at least one operating parameter of the motor vehicle, the at least one operating parameter characterizing a driving state of the motor vehicle other than a state of the first braking device;
check whether the at least one operating parameter satisfies a specified test criterion configured such that the specified test criterion is not satisfied when the first braking device is in a fault state; and
in response to the at least one operating parameter not satisfying the specified test criterion, actuating the second braking device to decelerate the motor vehicle.

11. The brake system as claimed in claim 10, wherein the second braking device is an automatic parking brake device.

12. The brake system as claimed in claim 10, wherein:
the first braking device is a hydraulic braking device; and
the second braking device is an electric braking device.

* * * * *

UNITED STATES PATENT AND TRADEMARK OFFICE
CERTIFICATE OF CORRECTION

PATENT NO. : 10,538,225 B2
APPLICATION NO. : 15/777508
DATED : January 21, 2020
INVENTOR(S) : Mannherz et al.

Page 1 of 1

It is certified that error appears in the above-identified patent and that said Letters Patent is hereby corrected as shown below:

In the Claims

In Claim 4, at Column 8, Line 55: "the first braking." should read --the first braking device.--.

Signed and Sealed this
Seventh Day of April, 2020

Andrei Iancu
*Director of the United States Patent and Trademark Office*